United States Patent [19]
Descamps et al.

[11] 3,891,648
[45] June 24, 1975

[54] 2-[(1,4-BENZODIOXAN)-2-YL]-ACETAMIDINES

[75] Inventors: Marcell Descamps, Crainhem; Alex Areschka, Brussels, both of Belgium

[73] Assignee: Labaz, Paris, France

[22] Filed: May 14, 1973

[21] Appl. No.: 360,142

[30] Foreign Application Priority Data
June 1, 1972   United Kingdom............... 25697/72

[52] U.S. Cl. 260/268 BC; 260/247.5 B; 260/293.58; 260/326.5 D; 260/340.3; 424/248; 424/250; 424/267; 424/274; 424/278

[51] Int. Cl............................................ C07d 51/70

[58] Field of Search ... 260/239 B, 247.5 B, 268 BC, 260/293.58, 326.5 D, 340.3

[56] References Cited
UNITED STATES PATENTS

| | | | |
|---|---|---|---|
| 3,185,692 | 5/1965 | Judd ................................... | 260/268 |
| 3,312,592 | 4/1967 | Chodnekar et al. .................. | 167/65 |
| 3,496,183 | 2/1970 | Toldy et al........................... | 260/268 |

OTHER PUBLICATIONS
Augstein et al., J. Med. Chem. 8(4), 446–456 (1965).

*Primary Examiner*—G. Thomas Todd
*Attorney, Agent, or Firm*—Mason, Kolehmainen, Rathburn & Wyss

[57] ABSTRACT

Compounds of the general formula:

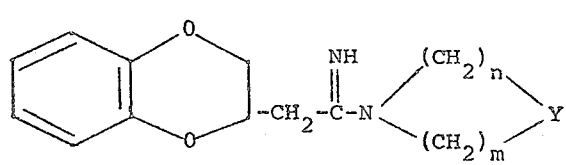

I wherein Y represents an oxygen atom, $CH_2$, $CH-CH_3$, NH or NR wherein R is branched- or straight-chain lower alkyl containing 1–4 carbon atoms, lower hydroxyalkyl containing 1–4 carbon atoms, carbethoxy, phenyl, chlorophenyl, fluorophenyl, trifluoromethylphenyl, benzyl, or pyridyl, *n* represents an integer from 1 to 3 and *m* represents one of the integers 2 and 3, and the pharmaceutically acceptable acid addition salts thereof, exhibit antihypertensive and sedative effects.

3 Claims, No Drawings

2-[(1,4-BENZODIOXAN)-2-YL]-ACETAMIDINES

This invention relates to heterocyclic compounds and is concerned with novel acetamidine derivatives having pharmacological activity and pharmaceutical compositions containing them, and with a process for preparing the said novel acetamidine derivatives.

The acetamidine derivatives with which the invention is concerned can be represented by the general formula:

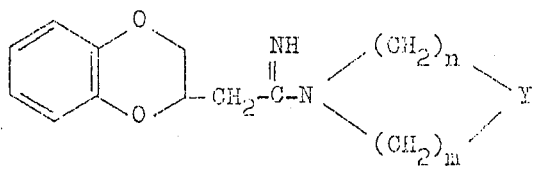

wherein Y represents an oxygen atom, a $CH_2$ or $CH-CH_3$ group or an NH or substituted NH group such as, for example, a methylamino, ethylamino, n-propylamino, isopropylamino, n-butylamino, 2-hydroxyethylamino, 2-hydroxy-n-propylamino, carbethoxyamino, phenylamino, chlorophenylamino, fluorophenylamino, trifluoromethyl-phenylamino, benzylamino, 2-pryidylamino or 4-pyridylamino group, $n$ represents an integer of from 1 to 3 and $m$ represents the integer 2 or 3.

The pharmaceutically acceptable single (mono) and double (di) acid addition salts of the acetamidine derivatives represented by formula I are also included within the scope of the present invention.

The compounds of formula I may be prepared by reacting in an inert organic medium, advantageously an alcoholic medium such as, for example, methanol or ethanol, preferably at room temperature, an iminoester salt represented by the general formula:

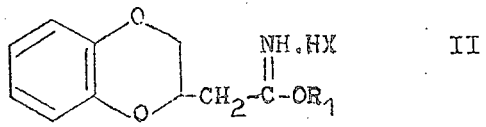

wherein $R_1$ represents a straight-chain lower alkyl radical containing from 1 to 4 carbon atoms and X represents the anion of a strong inorganic acid, preferably $Br^-$, $Cl^-$ or $SO_4H^-$, with a secondary cyclic amine represented by the general formula:

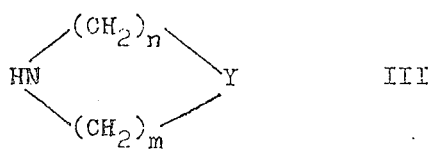

wherein Y, $n$ and $m$ have the same meanings as in formula I, to form the corresponding salt of the required compound of formula I which can then either be converted to a double salt by reaction with the required quantity of the appropriate acid or be reacted with a base, for example a sodium alcoholate in an anhydrous alcoholic medium, to give the compound of formula I in free base form which, if desired, may then be reacted with a stoichiometric quantity of an organic or inorganic acid to form a different single or double pharmaceutically acceptable acid addition salt.

The compounds of formula II may be prepared by reacting, under substantially anhydrous conditions and in the presence of a strong inorganic acid, 2-cyanomethyl-1,4-benzodioxan with a normal alcohol containing from 1 to 4 carbon atoms. 2-Cyanomethyl-1,4-benzodioxan is a known compound having been published, for example, in J. Med. Chem. 8, 446-456 (1965).

The compounds of the invention have been found to possess valuable pharmacological properties in that some of them exert a marked antihypertensive effect coupled with a sedative action on motricity, whilst others have been observed to possess only a sedative action on motricity, which would suggest that there is not necessarily any direct relationship between the two properties when present in one and the same molecule.

The antihypertensive properties of compounds of the invention are likely to render them valuable in the clinical treatment of disorders of the cardiovascular system characterized by high blood pressure. The fact that these compounds also possess a sedative action on motricity may well serve to enhance their antihypertensive action. It is, in fact, recognized that a state of hypertension can be maintained and even intensified by hyperactivity of those parts of the central nervous system which normally modulate the activity of the bulbar centres including the vasomotor system. This latter directly influences the tonus of the arterial walls and consequently the level of arterial blood pressure.

The fundamental causes of hypertension in man are unknown and many theories have been evolved, none of which supplies a completely satisfactory answer. It is, however, certain that hypertension is not due to any one single cause but to a combination of factors which may vary from one case to another.

There are at present in existence numerous substances which are capable of reducing high blood pressure. Although many of these substances give satisfactory results as regards the actual hypertension itself, they are not devoid of undesirable side-effects. Thus, for example, the diuretics can lead to a depletion from the body of reserves of potassium while the antiadrenergics and more particularly the α-antiadrenergic agents which are adrenolytic can give rise to orthostatic hypotension, bradycardia, hyperactivity of the gastrointestinal system and even severe depression. Those which are based upon alanine have been known to cause retention of salt and water, nasal congestion and, at times, orthostatic hypotension, while the β-receptor blocking agents can lead to fatigue, lethargy and vertigo. The hydrazino-phthalazines can cause headache, nausea and anorexia.

A certain number of the antihypertensive agents known up to present exert a ganglioplegic effect in that they interrupt the sympathicotonic impulses thus causing relaxation of the vascular walls. This phenomenon may be dangerous in cases where the patient requires increased tonicity of the vascular walls as a result of, for example, a change of position. Other known agents exert such a sudden and powerful antihypertensive effect that their action is difficult to control.

Many of these disadvantages are avoided or at least mitigated by the compounds of the invention and in particular the preferred compounds, namely:

2-[(1,4-benzodioxan)-2-yl]-N,N-(3-n-propyl-3-aza-pentamethylene)-acetamidine and
2-[(1,4-benzodioxan)-2-yl]-N,N-(3-methyl-3-aza-pentamethylene)-acetamidine, these compounds advantageously being employed in the form of their pharmaceutically acceptable acid addition salts, for example the hydrochlorides which are hereinafter referred to respectively as Compound A and Compound B.

For instance, the compounds of the invention do not exert any ganglioplegic or adrenolytic effect while their antihypertensive action is easy to control. This latter advantage is due to the fact that the antihypertensive effect is moderate at first and gradually increases in intensity according to the dose administered, thus eliminating the danger of the sudden fall of arterial pressure which may occur when agents are used which exert too rapid an antihypertensive effect. Furthermore, the antihypertensive action of compounds of the invention is exerted with little or no undesirable side-effects and an extremely low degree of toxicity, while no signs of loss of activity due to habituation have so far been observed.

From the fact that the causes of hypertension are unknown but are undoubtedly numerous and varied it is clear that no single substance can have maximum efficacy in all cases. There is, therefore, always a place for further effective substances such as those described herein.

Finally it should be noted that compounds of the invention are likely to provide valuable replacement medication. It frequently occurs, in fact, that when the same therapeutic agent is administered to the same patient over a lengthy period of time, the doctor prefers, for psychological or other reasons, to change the agent and use another medicament having the same therapeutic indications. Under these circumstances, compounds of the invention may be expected, as stated above, to constitute extremely valuable replacement agents.

Pharmacological tests have been undertaken with a view to demonstrating the antihypertensive properties of compounds of the invention and their sedative effect on motricity, and also for the purpose of detecting any ganglioplegic or adrenolytic activity.

In the trials relating to antihypertensive activity the following scale of values has been adopted:

| Value | Reduction of Arterial Pressure |
| --- | --- |
| 1 corresponds to | 5 to 10 mm. Hg |
| 2 corresponds to | 10 to 20 mm. Hg |
| 3 corresponds to | 20 to 30 mm. Hg |
| 4 corresponds to | 30 to 40 mm. Hg |

In all the antihypertensive trials, the compound to be tested was administered intragastrically unless otherwise indicated. In the acute tests, one single dose was given and blood pressure was measured every hour for 6 hours after administration. In the chronic tests, blood pressure was measured every day just before the day's dose was given.

The first antihypertensive test was carried out on male rats weighing between 140 and 170 g. in which chronic renal hypertension had been induced by the Grollman technique [Proc. Soc. exp. Biol. Med., 57, 102 (1944)]. According to this technique, the animals are anaesthetized with ether and one kidney is displaced from its site without being detached from the body, the suprarenal gland having been first liberated from the kidney but otherwise left intact. The kidney is then bound with twine in the form of a figure eight, just tightly enough to alter slightly the ellipsoid shape of the organ. Ten days later, the other kidney is completely removed together with its suprarenal gland. About 4 weeks after the second operation, most of the animals develop severe hypertension, systolic pressure in the majority of cases exceeding 180 mm. Hg.

Groups of rats so treated received compounds of the invention in a dose of 100 mg./kg. by intragastric route. Arterial pressure was measured immediately and 1, 2, 3, 4, 5 and 6 hours after administration.

The preferred compounds cited above gave the maximum results shown hereunder at the times indicated.

| Compound | Value |
| --- | --- |
| A | 4 after five hours |
| B | 3 after four hours |

In this same test, Compound A was also administered intragastrically in doses of 12.5 mg./kg., 25 mg./kg. and 50 mg./kg. which gave respective pressure reduction values of 1 after 4 hours, 2 after 5 hours and 3 after 5 hours.

By duodenal route in a dose of 50 mg/kg. Compound A gave, in the same test respective pressure reduction values of 3 after 1 hour and 4 after 3, 4, 5 and 6 hours.

In the same test performed with a well-known antihypertensive agent, namely α-methyl-(3,4-dihydroxyphenyl)-alanine, it was found that an intragastric dose of 400 mg./kg. of the latter was required to obtain an activity value of 3.

Another agent recognized as possessing antihypertensive properties, namely hydrochlorothiazide proved to be inactive in this test at a dose of 200 mg./kg. given by intragastric route.

Compound A was also administered intragastrically to rats in daily doses of 12.5 mg./kg., 25 mg./kg. and 50 mg./kg. in chronic tests lasting eleven days. The maximum reduction value per dose is given below with indication of the time:

| Dose | Value |
| --- | --- |
| 12.5 mg./kg. per day | 1 after seven days |
| 25.0 mg./kg. per day | 2 after eight days |
| 50.0 mg./kg. per day | 4 after eight days |

In the second antihypertensive test, a state of marked hypertension was provoked in female rats weighing about 100 g. One kidney with the corresponding adrenal gland was removed under anaesthesia after which a daily dose of 50 mg./kg. of desoxycorticosterone acetate was administered subcutaneously 5 days a week for 4 consecutive weeks. Throughout this period, the drinking water for the animals contained 1% NaCl. Towards the end of treatment arterial pressure rose to about 200 mm. Hg.

Compound A was given to these rats in doses of 12.5 mg./kg., 25 mg./kg. and 50 mg./kg. in both acute and chronic tests.

In the acute test the following maximum reduction values were registered:

| Dose | Value |
| --- | --- |
| 12.5 mg./kg. | 1 after four hours |
| 25.0 mg./kg. | 2 after five hours |
| 50.0 mg./kg. | 3 after four hours |

The corresponding results in the chronic test were

| Dose | Value |
| --- | --- |
| 12.5 mg./kg. per day | 1 after five days |
| 25.0 mg./kg. per day | 2 after five days |
| 50.0 mg./kg. per day | 3 after eight days |

In the third antihypertensive test, male rats 21 to 23 days old and weighing about 55 g. received, during the 6 weeks after weaning, normal food to which 6% NaCl had been added. At the end of this period the average systolic arterial pressure was 180 mm. Hg.

Here also acute and chronic tests were performed with Compound A in doses of 12.5 mg./kg., 25 mg./kg. and 50 mg./kg.

The maximum reduction values obtained in the acute test were as follows:

| Dose | Value |
| --- | --- |
| 12.5 mg./kg. | 1 after four hours |
| 25.0 mg./kg. | 2 after three hours |
| 50.0 mg./kg. | 4 after three hours |

In the chronic test, the results registered were:

| Dose | Value |
| --- | --- |
| 12.5 mg./kg. per day | 1 after six days |
| 25.0 mg./kg. per day | 2 after four days |
| 50.0 mg./kg. per day | 3 after six days |

In the fourth antihypertensive test, young rats, as soon as they were weaned, underwent unilateral nephrectomy after which they received the normal diet to which 6% NaCl had been added. At the end of 5 or 6 weeks, the average arterial pressure exceeded 180 mm. Hg.

Compound A was administered in both acute and chronic tests in doses of 12.5 mg./kg., 25 mg./kg. and 50 mg./kg.

The maximum pressure reduction values obtained in the acute test were as follows:

| Dose | Value |
| --- | --- |
| 12.5 mg./kg. | 1 after four hours |
| 25.0 mg./kg. | 2 after five hours |
| 50.0 mg./kg. | 3 after five hours |

The corresponding results in the chronic test were:

| Dose | Value |
| --- | --- |
| 12.5 mg./kg. per day | 2 after eight days |
| 25.0 mg./kg. per day | 2 after eight days |
| 50.0 mg./kg. per day | 3 after nne days |

In the fifth antihypertensive test, hypertension was produced in male rats weighing from 200 to 250 g. by sinocarotid and aortic denervation in accordance with the technique described by E. M. KRIEGER in Circulation Research, Vol. XV, December 1964.

Here also Compound A was given in doses of 12.5 mg./kg., 25 mg./kg. and 50 mg./kg. in acute and chronic tests.

The results obtained in the acute test were as follows:

| Dose | Value |
| --- | --- |
| 12.5 mg./kg. | 2 after four hours |
| 25.0 mg./kg. | 3 after five hours |
| 50.0 mg./kg. | 4 after three hours |

The corresponding results in the chronic test were:

| Dose | Value |
| --- | --- |
| 12.5 mg./kg. per day | 1 after eight days |
| 25.0 mg./kg. per day | 2 after nine days |
| 50.0 mg./kg. per day | 4 after four days |

The sixth antihypertensive test was carried out on male rats belonging to a race which has been specially bred to produce animals having high blood pressure. The animals used in this test were about 10 weeks old and had a blood pressure reading in the region of 180 mm. Hg.

In this series, Compound A gave the following results in acute and chronic tests and in doses of 25 mg./kg., 50 mg./kg. and 100 mg./kg. in the acute test and 25 mg./kg., 100 mg./kg. and 200 mg./kg. in the chronic test.

| Acute | |
| --- | --- |
| Dose | Value |
| 25 mg./kg. | 2 after four hours |
| 50 mg./kg. | 3 after four hours |
| 100 mg./kg. | 4 after four hours |

| Chronic | |
| --- | --- |
| Dose | Value |
| 25 mg./kg. per day | 0 |
| 100 mg./kg. per day | 3 after eight days |
| 200 mg./kg. per day | 4 after six days |

In the six chronic antihypertensive tests described hereabove it was observed that the maximum values of reduction of arterial pressure so obtained were maintained at least up to the end of the tests.

The six antihypertensive tests described above show that Compound A exerts an antihypertensive effect on all six types of experimental chronic arterial hypertension used. Since the causes of hypertension are numerous and varied, it is essential, if an antihypertensive agent is to be useful, that it be effective against hypertension of various origins. This has been shown to be particularly true in the case of Compound A. Moreover, it was observed in the chronic tests that the reduction in blood pressure produced by Compound A was maintained as long as the compound was administered and that pressure rose very gradually after cessation of treatment, taking several days to return to its initial level.

A pharmocological test was also carried out on the anaesthetized cat with a view to showing that Compound A is devoid of ganglioplegic activity. The tonus of the nictitating membrane was first noted after which the contractile reaction of the membrane to electric stimulation of the preganglionic fibre of the cervical sympathetic nerve was tested. It was found that intravenous doses of Compound A up to 10 mg./kg. did not modify the intensity of the contractions of the membrane provoked by the electric stimulation. This proves that Compound A is devoid of ganglioplegic effects.

Another pharmacological test carried out on the dog anaesthetized with sodium pentobarbital and atropinized has shown that two intravenous doses of 10 mg./kg. of Compound A do not modify the hypertensive effect of epinephrine injected into the vein. This proves that Compound A is also devoid of adrenolytic properties.

Finally, pharmacological tests were performed with mice in order to determine the sedative action of compounds of the invention on motricity.

The animals were first divided into two groups of which one group received 50 mg./kg. of the compound to be studied by intragastric route and the other group, the control group, received an equivalent quantity of the exipient used with the compound to be studied. Thirty minutes later, each group was placed in a cylindrical container, through which a ray of light was projected. By means of a photoelectric cell, a record was made of the number of times the animals of each group passed through the light ray over a period of 15 minutes. At the end of these two tests the figures for the treated group were compared with those of the control group. For this purpose, the control group figure was considered as representing 100%. The figure corresponding to the number of times the treated group interrupted the light ray was converted to a value by the same calculation as that used to convert the control group figure to 100%. The treated group value was then deducted from the 100% of the control group and the difference was considered to be the motricity depressant effect value for the compound which had been given to the treated group. Thus a motricity depressant effect value (M.D.E.) expressed as M.D.E. 63 means that the compound concerned reduced the motor activity of the treated animal by 63% as compared with the control animals.

In this test the following compounds were examined:
Compound A.
Compound B.
2-[(1,4-benzodioxan)-2-yl]-N,N-(3-ethyl-3-aza-pentamethylene)-acetamidine (Compound C)
2-[(1,4-benzodioxan)-2-yl]-N,N-(3-isopropyl-3-aza-pentamethylene)-acetamidine (Compound D)
2-[(1,4-benzodioxan)-2-yl]-N,N-(3-n-butyl-3-aza-pentamethylene)-acetamidine (Compound E)
2-[(1,4-benzodioxan)-2-yl]-N,N-pentamethylene acetamidine (Compound F)
2-[(1,4-benzodioxan)-2-yl]-N,N-(3-oxa-pentamethylene)-acetamidine (Compound G)
2-[(1,4-benzodioxan)-2-yl]-N,N-[3-(4-chlorophenyl)-3-aza-pentamethylene]-acetamidine (Compound H)
2-[(1,4-benzodioxan)-2-yl]-N,N-[3-(4-fluorophenyl)-3-aza-pentamethylene]-acetamidine (Compound I)
2-[(1,4-benzodioxan)-2-yl]-N,N-[3-(2-pyridyl)-3-aza-pentamethylene]-acetamidine (Compound J)
2-[(1,4-benzodioxan)-2-yl]-N,N-[3-(3-trifluoromethyl-phenyl)-3-aza-pentamethylene]-acetamidine (Compound K)
2-[(1,4-benzodioxan)-2-yl]-N,N-heptamethylene acetamidine (Compound L)
2-[(1,4-benzodioxan)-2-yl]-N,N-(3-methyl-pentamethylene)-acetamidine (Compound M)
2-[(1,4-benzodioxan)-2-yl]-N,N-(3-methyl-3-aza-hexamethylene)-acetamidine (Compound N)

All these compounds were employed in the form of a pharmaceutically acceptable acid addition salt, such as the hydrochloride.

The following results were registered:

| Compound | M.D.E. |
|---|---|
| A | 42 |
| B | 41 |
| C | 39 |
| D | 63 |
| E | 57 |
| F | 60 |
| G | 50 |
| H | 58 |
| I | 61 |
| J | 34 |
| K | 47 |
| L | 29 |
| M | 45 |
| N | 10 |

Acute toxicity trials were carried out by intragastric route on rats and mice which were kept under observation for seven days following administration. It was found that with Compound A the $LD_{50}$ for rats was 1900 mg./kg. and for mice 1800 mg./kg. These figures compare very favourably with the intragastric active doses of 50 mg./kg. and 100 mg./kg. of which the effects are described hereinabove and show that there is a very wide safety margin between the toxic dose and the therapeutic dose.

It will be appreciated that for therapeutic use the compounds of the invention will normally be administered in the form of a pharmaceutical composition which may be in a dosage unit form appropriate to the desired mode of administration. The composition may be administered orally or rectally or by injection and hence it may take the form of, for example, a coated or uncoated tablet, a hard- or soft-gelatin capsule or an oily suspension for oral administration, a suppository for rectal administration or a non-aqueous solution for administration by injection.

Irrespective of the form which the composition takes, the pharmaceutical composition will normally comprise at least one of the compounds of formula I or a pharmaceutically acceptable acid addition salt thereof in association with a pharmaceutical excipient therefor. Examples of excipients which may be used are milk sugar, starches, talc, magnesium stearate, polyvinylpyrrolidone, alginic acid and colloidal silica. The composition may also contain a varnishing agent such as cellulose acetophthalate and/or a plasticizer such as diethylphthalate and, if desired, a flavouring agent.

The following Examples illustrate the preparation of compounds of the invention and of pharmaceutical compositions containing compounds of the invention.

EXAMPLE 1

2-[(1,4-Benzodioxan)-2-yl]-N,N-(3-n-propyl-3-aza-pentamethylene)-acetamidine hydrochloride To a solution of 12.8 g. (0.1 mol) of 1-n-propylpiperazine in 100 ml. of methanol were added 25.7 g. (0.1 mol) of ethyl (1,4-benzodioxan)-2-yl-iminoacetate hydrochloride. The mixture was allowed to stand at room temperature for 72 hours, after which the solvent was evaporated under reduced pressure. The very viscous oily residue which formed was taken up in 70–100 ml. of acetone. The mixture was gently heated on a water-bath and the precipitate which appeared was filtered off after cooling.

By this procedure, 17.7 g. of 2-[(1,4-benzodioxan)-2-yl]-N,N-(3-n-propyl-3-aza-pentamethylene)-acetamidine hydrochloride (m.p. 178°–182°C.) were obtained, representing a yield in crude product of 52% of the theoretical value.

Dihydrochloride

The 2-[(1,4-benzodioxan)-2-yl]-N,N-(3-n-propyl-3-aza-pentamethylene)-acetamidine hydrochloride obtained as described above was converted to the dihydrochloride salt as follows:

While rapidly stirring, a solution of 156 g. of 2-[(1,4-benzodioxan)-2-yl]-N,N-(3-n-propyl-3-aza-pentamethylene)-acetamidine hydrochloride in about 900 ml. of isopropanol was acidified by means of an ethereal solution of dry hydrochloric acid. Stirring was maintained until the greater part of the dihydrochloride of the above amidine derivative precipitated. It was allowed to stand for 12 hours at 0°C. The precipitate was filtered out, washed with fresh isopropanol and with ethyl ether. The crude product was dried under vacuum in a drying oven at 50°C.

In this manner, 155 g. of 2-[(1,4-benzodioxan)-2-yl]-N,N-(3-n-propyl-3-aza-pentamethylene)-acetamidine dihydrochloride, m.p. 198°–202°C., were obtained.

Free base

While stirring, a solution of 16.98 g. (0.05 mol) of 2-[(1,4-benzodioxan)-2-yl]-N,N-(3-n-propyl-3-aza-pentamethylene)-acetamidine hydrochloride in 150 ml. of dry ethanol was added to sodium ethylate prepared from 1.15 g. (0.05 at. g.) of sodium in 100 ml. of dry ethanol. After the inorganic precipitate had been filtered out, the solvent was evaporated under reduced pressure and the residue was taken up in 300 ml. of dry ethyl ether. The solution so obtained was treated with animal charcoal and the solvent was evaporated under reduced pressure. After drying under high vacuum 15.1 g. of an oily residue constituted by 2-[(1,4-benzodioxan)-2-yl]-N,N-(3-n-propyl-3-aza-pentamethylene)-acetamidine were obtained, which represents a yield of 100% of the theoretical value.

Fumarate

From the free base obtained as described above the fumarate was prepared as follows:

While stirring, a solution of 1.16 g. (0.01 mol) of fumaric acid in 50 ml. of isopropanol was added to a solution of 3.04 g. (0.01 mol) of 2-[(1,4-benzodioxan)-2-yl]-N,N-(3-n-propyl-3-aza-pentamethylene)-acetamidine in 25 ml. of isopropanol. After the reaction mixture had been allowed to stand for 24 hours at 20°C., the precipitate formed was filtered out and washed with isopropanol and ethyl ether.

In this manner, 3 g. of 2-[(1,4-benzodioxan)-2-yl]-N,N-(3-n-propyl-3-aza-pentamethylene)-acetamidine fumarate were obtained which, when recrystallized from an isopropanol/ethanol mixture, had a m.p. of 155°–158°C.

By the same procedure as that described above, but using the appropriate starting-products, the following compounds of formula I were prepared:

| Compounds | Melting point °C. |
| --- | --- |
| 2-[(1,4-benzodioxan)-2-yl]-N,N-pentamethylene-acetamidine hydrochloride | 220–224 |
| 2-[(1,4-benzodioxan)-2-yl]-N,N-(3-methyl-pentamethylene)-acetamidine hydrochloride | 180–184 |
| 2-[(1,4-benzodioxan)-2-yl]-N,N-heptamethylene-acetamidine hydrochloride | 184–187 |
| 2-[(1,4-benzodioxan)-2-yl]-N,N-(3-oxa-pentamethylene)-acetamidine hydrochloride | 224–227 |
| 2-[(1,4-benzodioxan)-2-yl]-N,N-[3-(4-chlorophenyl)-3-aza-pentamethylene]-acetamidine hydrochloride | 192–195 |
| 2-[(1,4-benzodioxan)-2-yl]-N,N-[3-(4-fluorophenyl)-3-aza-pentamethylene]-acetamidine hydrochloride | 205–208 |
| 2-[(1,4-benzodioxan)-2-yl]-N,N-[3-(2-pyridyl)-3-aza-pentamethylene]-acetamidine hydrochloride | 142–145 (decomposition) |
| 2-[(1,4-benzodioxan)-2-yl]-N,N-(3-methyl-3-azapentamethylene)-acetamidine hydrochloride | 185–188 |
| 2-[(1,4-benzodioxan)-2-yl]-N,N-(3-ethyl-3-azapentamethylene)-acetamidine hydrochloride | 212–214 |
| 2-[(1,4-benzodioxan)-2-yl]-N,N-(3-n-butyl-3-aza-pentamethylene-acetamidine hydrochloride | 172–174 |
| 2-[(1,4-benzodioxan)-2-yl]-N,N-(3-methyl-3-aza-hexamethylene)-acetamidine hydrochloride | 178–181 |
| 2-[(1,4-benzodioxan)-2-yl]-N,N-(3-isopropyl-3-aza-pentamethylene)-acetamidine hydrochloride | 161–164 |
| 2-[(1,4-benzodioxan)-2-yl]-N,N-[3-(3-trifluoromethylphenyl)-3-aza-pentamethylene]-acetamidine hydrochloride | 150–154 |

EXAMPLE 2

Tablets were prepared by compressing ungranulated powders of the following ingredients in accordance with known pharmaceutical techniques:

| Ingredient | mg. per tablet |
| --- | --- |
| 2-[(1,4-Benzodioxan)-2-yl]-N,N-(3-n-propyl-3-aza-pentamethylene)-acetamidine hydrochloride | 50 |
| Milk sugar | 125 |
| Corn starch | 50 |
| Polyvinylpyrrolidone | 11 |
| Sodium carboxymethyl starch | 7 |
| Talc | 5 |
| Colloidal silica | 0.5 |
| Magnesium stearate | 1.5 |
| | 250.0 mg. |

EXAMPLE 3

Tablets were prepared by compressing ungranulated powders of the following ingredients in accordance with known pharmaceutical techniques:

| Ingredient | mg per tablet |
| --- | --- |
| 2-[(1,4-benzodioxan)-2-yl]-N,N-(3-n-propyl-3-aza-pentamethylene)-acetamidine hydrochloride | 100 |
| Milk Sugar | 100 |
| Corn starch | 25 |
| Polyvinylpyrrolidone | 12 |
| Sodium carboxymethyl starch | 7 |
| Talc | 4 |
| Colloidal silica | 0.5 |
| Magnesium stearate | 1.5 |
| | 250 mg |

EXAMPLE 4

Hard-gelatine capsules were prepared with an enteric coating from the following ingredients in accordance with known pharmaceutical techniques:

| Ingredient | mg per capsule |
| --- | --- |
| 2-[(1,4-benzodioxan)-2-yl]-N,N-(3-n-propyl-3-aza-pentamethylene)-acetamidine hydrochloride | 200 |
| Milk Sugar | 110 |
| Corn starch | 43 |
| Polyvinylpyrrolidone | 16 |
| Polyethyleneglycol 400 | 3 |
| Sodium carboxymethyl starch | 15 |
| Talc | 8 |
| Colloidal silica | 0.5 |
| Magnesium stearate | 1.5 |

The following ingredients expressed in mg. were employed for the enteric coating:

| | |
| --- | --- |
| Cellulose acetophthalate | 20 |
| Diethylphthalate | 5 |
| Gelatin | 2 |
| Gum-arabic | 2 |
| Crystallized sugar | 154 |
| Powdered sugar | 16 |
| Corn starch | 6 |
| Talc | 27 |
| Wheat starch | 6 |
| Titanium oxide | 6 |
| Colloidal silica | 3 |
| Sodium dioctylsulphosuccinate | 1.2 μg |
| Hard wax | 0.5 |
| White wax | 0.1 |

We claim:

1. A compound of the formula:

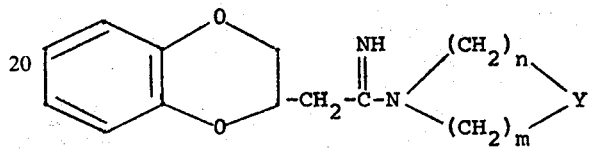

I wherein Y represents an oxygen atom, $CH_2$, $CH-CH_3$, NH or NR wherein R is branched- or straight-chain lower alkyl containing 1–4 carbon atoms, lower hydroxyalkyl containing 1–4 carbon atoms, carbethoxy, phenyl, chlorophenyl, fluorophenyl, trifluoromethylphenyl, benzyl, or pyridyl, $n$ represents an integer from 1 to 3 and $m$ represents one of the integers 2 and 3, and the pharmaceutically acceptable acid addition salts thereof.

2. 2-[(1,4-Benzodioxan)-2-yl]-N,N-(3-n-propyl-3-aza-pentamethylene)-acetamidine and its pharmaceutically acceptable acid addition salts.

3. 2-[(1,4-Benzodioxan)-2-yl]-N,N-(3-methyl-3-aza-pentamethylene)-acetamidine and its pharmaceutically acceptable acid addition salts.

* * * * *

UNITED STATES PATENT OFFICE
CERTIFICATE OF CORRECTION

Patent No. 3,891,648    Dated June 24, 1975

Inventor(s) Marcel Descamps and Alex Areschka

It is certified that error appears in the above-identified patent and that said Letters Patent are hereby corrected as shown below:

The Christian name of the first inventor should be "Marcel".

Column 1, line 27 -- "2-pryidylamino" should be --2-pyridylamino--

Column 6, line 5 - "nne" should read -- nine --.

Column 10, line 42 - there should be parenthesis after "tamethylene".

Column 12, line 7 - "6" should read -- 16 --.

Signed and Sealed this twentieth Day of January 1976

[SEAL]

Attest:

RUTH C. MASON
Attesting Officer

C. MARSHALL DANN
Commissioner of Patents and Trademarks